United States Patent
Wakileh et al.

(10) Patent No.: US 10,088,644 B2
(45) Date of Patent: Oct. 2, 2018

(54) MICRODUCT COUPLING AND TERMINATION

(71) Applicant: Communications Systems, Inc., Minnetonka, MN (US)

(72) Inventors: George I. Wakileh, Batavia, IL (US); Federico Zamora Lopez, Heredia (CR); Randall Marin Martinez, Alajuela (CR); Clifford A. Ginn, Myrtle Beach, SC (US)

(73) Assignee: Communications Systems, Inc., Minnetonka, MN (US)

( * ) Notice: Subject to any disclaimer, the term of this patent is extended or adjusted under 35 U.S.C. 154(b) by 0 days.

(21) Appl. No.: 15/754,529

(22) PCT Filed: Oct. 25, 2016

(86) PCT No.: PCT/US2016/058662
§ 371 (c)(1),
(2) Date: Feb. 22, 2018

(87) PCT Pub. No.: WO2017/074935
PCT Pub. Date: May 4, 2017

(65) Prior Publication Data
US 2018/0252889 A1 Sep. 6, 2018

Related U.S. Application Data

(60) Provisional application No. 62/247,478, filed on Oct. 28, 2015.

(51) Int. Cl.
*G02B 6/44* (2006.01)
*G02B 6/38* (2006.01)

(52) U.S. Cl.
CPC .......... *G02B 6/4471* (2013.01); *G02B 6/3897* (2013.01); *G02B 6/4459* (2013.01); *G02B 6/4452* (2013.01)

(58) Field of Classification Search
CPC .......... G02B 6/38; G02B 6/3897; G02B 6/44; G02B 6/4452; G02B 6/4459; G02B 6/4471
See application file for complete search history.

(56) References Cited

U.S. PATENT DOCUMENTS

| 4,075,803 A | 2/1978 | Alesi |
| 5,078,432 A | 1/1992 | Seiter |

(Continued)

FOREIGN PATENT DOCUMENTS

| EP | 2172796 | 4/2010 |
| EP | 2527897 | 11/2012 |

(Continued)

OTHER PUBLICATIONS

"200-110289 10 mm Microduct Coupler," Millenium Product description retrieved from <http://www.mymillenium.us/products-new/microduct-couplers-and-accessories/200-110289> on May 6, 2015 (1 page).

(Continued)

*Primary Examiner* — Andrew Jordan
(74) *Attorney, Agent, or Firm* — Pauly, DeVries Smith & Deffner LLC

(57) ABSTRACT

Microduct coupling and termination devices are provided. One coupling system includes a support structure with first and second sides. Multiple couplers are configured to receive corresponding microducts on the first side. Each coupler includes a wall connected to the support structure, which defines a cavity for receiving a microduct on the support structure first side. Each coupler removably retains the microduct within the cavity and provides a seal between the wall and microduct. A port adapter has a base unit, a hinged cover, at least one cable port, and support structure with multiple couplers that receive and removably retain microducts. A microduct coupling panel has multiple cou- (Continued)

plers connected to a planar frame in a grid arrangement. A perimeter of the panel can removably couple with a corresponding coupling portion of at least one of a terminal enclosure and a port adaptor.

18 Claims, 8 Drawing Sheets

(56) References Cited

U.S. PATENT DOCUMENTS

| | | | | |
|---|---|---|---|---|
| 6,833,112 | B2* | 12/2004 | Hoummady | B01J 19/0046 347/21 |
| 6,943,444 | B2* | 9/2005 | von Gutfeld | F28F 3/04 257/714 |
| 7,123,802 | B2* | 10/2006 | Engberg | G02B 6/4459 385/112 |
| 7,274,850 | B2 | 9/2007 | Wittmeier et al. | |
| 7,869,682 | B2 | 1/2011 | Kowalczyk et al. | |
| 7,953,311 | B2 | 5/2011 | Mullaney et al. | |
| 8,374,475 | B2* | 2/2013 | Griffioen | G02B 6/4457 254/134.4 |
| 8,848,347 | B2* | 9/2014 | Doorn | G02B 6/4447 174/15.1 |
| 2002/0121529 | A1* | 9/2002 | Hoummady | B01J 19/0046 222/113 |
| 2005/0092007 | A1* | 5/2005 | Gutfeld | F28F 3/04 62/259.2 |
| 2006/0072885 | A1* | 4/2006 | Engberg | G02B 6/4459 385/112 |
| 2009/0324188 | A1 | 12/2009 | Berglund et al. | |
| 2010/0010331 | A1 | 1/2010 | Brauker et al. | |
| 2010/0178020 | A1* | 7/2010 | Griffioen | G02B 6/4457 385/135 |
| 2012/0012205 | A1* | 1/2012 | Doorn | G02B 6/4447 137/561 R |
| 2012/0145453 | A1* | 6/2012 | Temple | H01B 7/185 174/70 C |
| 2013/0105058 | A1* | 5/2013 | Temple | H01B 7/185 156/51 |
| 2014/0265322 | A1 | 9/2014 | Thompson | |
| 2015/0233781 | A1* | 8/2015 | Hubert | G01M 5/0025 73/37 |
| 2016/0186167 | A1* | 6/2016 | Faltin | C12N 15/1017 435/270 |
| 2018/0038526 | A1* | 2/2018 | Cloninger | F16L 15/08 |
| 2018/0081135 | A1* | 3/2018 | Hill | G02B 6/4442 |
| 2018/0081136 | A1* | 3/2018 | Hill | G02B 6/4442 |

FOREIGN PATENT DOCUMENTS

| | | |
|---|---|---|
| WO | 03065101 | 8/2003 |
| WO | 2014186433 | 11/2014 |
| WO | 2015108222 | 7/2015 |
| WO | 2017074935 | 5/2017 |

OTHER PUBLICATIONS

"Caladen Microduct Connectors," Overview and Product Range retrieved from <http://www.caladen.com/microduct-connectors.html> on Apr. 24, 2015 (2 pages).

"Caladen Microduct Range," Data Sheet Product Description retrieved from <http://www.caladen.com> on May 5, 2015 (2 pages).

"Caladen Safety Instructions," Data Sheet retrieved from <http://www.caladen.com/datasheets/Caladen-Safety(0194).pdf> on May 1, 2015 (6 pages).

"Duct Branch Closure, 3/NDE 451 200 for 4 branches," Specification sheet and ordering information, Ericsson.com (2 pages).

"FAT Jointing Cabinet, medium NCD 518 8004/2, 3 Fiber access Terminal," Ericsson Data Sheet (4 pages).

"Fibre Termination/Distribution Box—8 port CALFTB8," Caladen Specification Sheet retrieved from <http://www.caladen.com/ancillary/calftb8.html> on May 1, 2015 (2 pages).

"Fibre Termination/Distribution Box—16 Port CALFTB16," Caladen Specification Sheet retrieved from <http://www.caladen.com/ancillary/calftb16.html> on May 1, 2015 (1 page).

"FutureLink Stackable Fiber Interface Terminal System," by Suttle. Specification sheet 2015 (4 pages).

"Futurepath Flex Installation Recommendations," Technical Bulletin by A-D technologies (22 pages).

"International Search Report and Written Opinion," for PCT application No. PCT/US2016/058662 dated Dec. 22, 2016 (21 pages).

"MicroDuct Couplers & Accessories," Sherman Reilly Product Information retrieved from <http://sherman-reilly.com/news/products_list/microduct-couplers-accessories/> (5 pages).

"Microduct Range 2014-2015," Caladen Microduct Spec. Sheets (3 pages).

"Microducts," Wikipedia Entry retrieved from <http://en.wikipedia.org/wiki/Microducts> on Apr. 17, 2015 (5 pages).

"Push-Lock 1 1/2," Dura-line product specification sheet retrieved from <http://www.duraline.com/accessory/push-lock-1-12> on May 6, 2015 (2 pages).

* cited by examiner

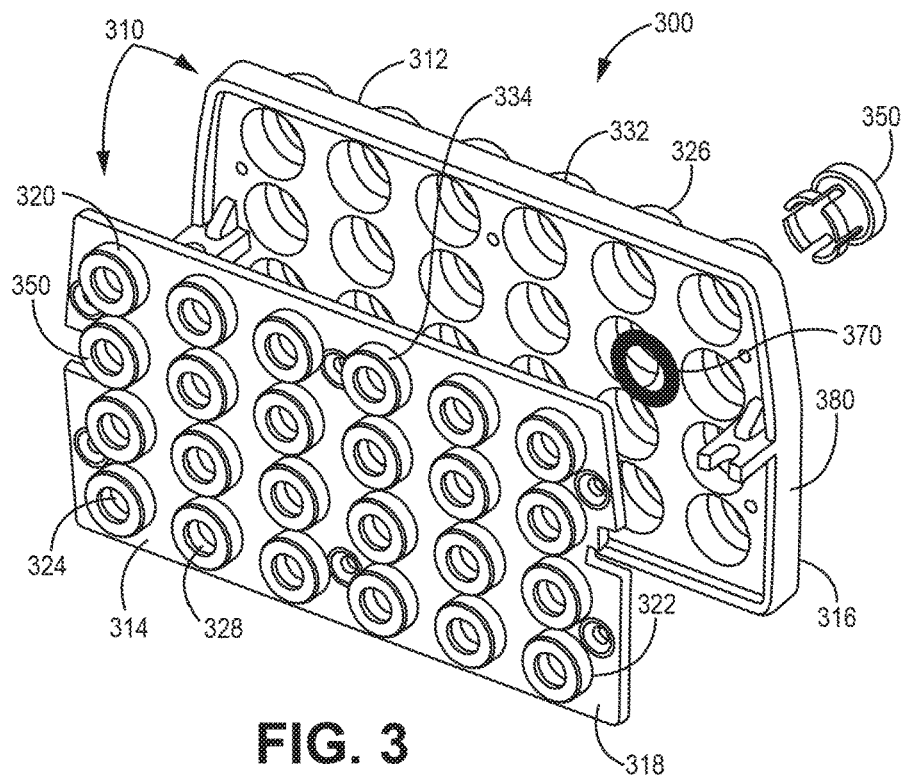
FIG. 3
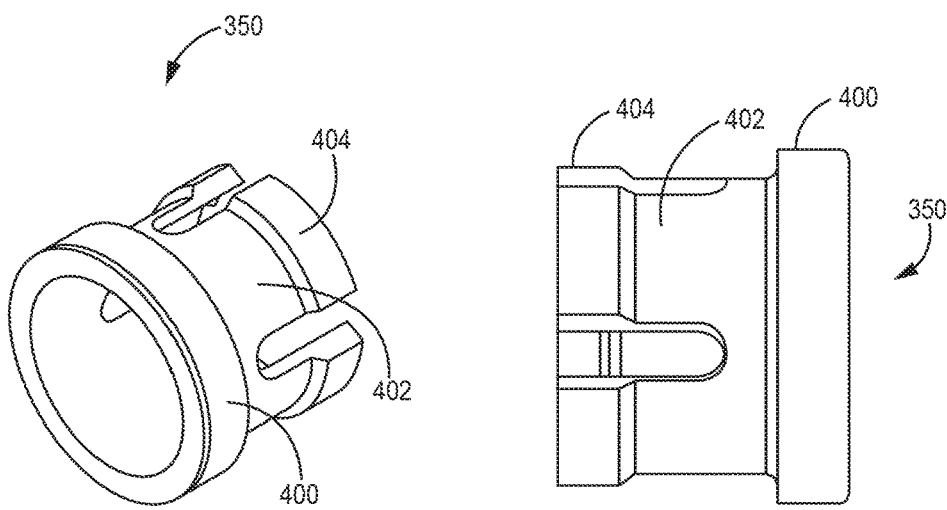
FIG. 4A  FIG. 4B

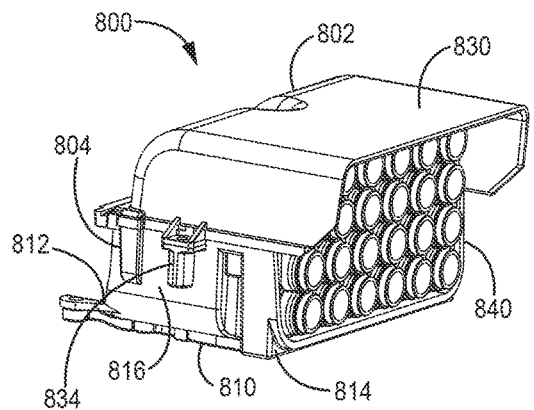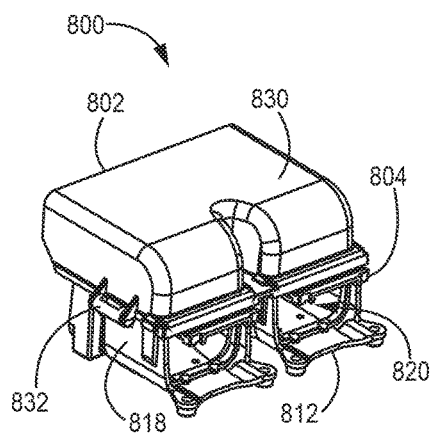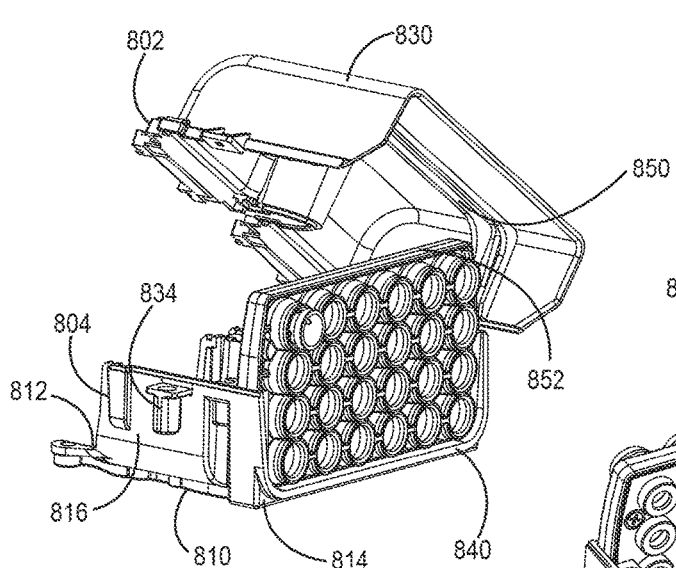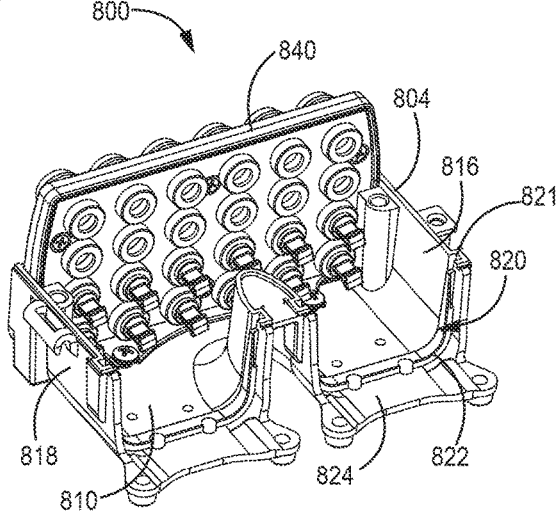
FIG. 8A
FIG. 8B
FIG. 8C
FIG. 8D

MICRODUCT COUPLING AND TERMINATION

PRIORITY

This application is a national stage application under 35 U.S.C. 371 of International Patent Application Serial No. PCT/US2016/058662, entitled "MICRODUCT COUPLING AND TERMINATION," filed on Oct. 25, 2016, which claims priority to U.S. provisional patent application No. 62/247,478, filed Oct. 28, 2015, the contents of which is incorporated by reference herein in its entirety.

FIELD

This disclosure is generally related to devices and systems for terminating microducts at distribution points within a communications network. The teachings provided herein are more particularly related to coupling one or more microducts to a terminal enclosure in a removable and secure manner.

BACKGROUND

The present invention relates to microduct termination systems. Microducts, as commonly used in the telecommunication industry, are small ducts used for the installation and protection of cables. They are typically used to provide low-friction paths for the installation of cables, such as fiber optic cables. It is common practice to lay one or more microducts in a desired path and then to populate each microduct with one or more communication cables.

At certain points in a network of microducts, it is desirable to terminate a path. In some instances, more than one microduct path is terminated at a single location. This might occur where multiple microducts are routed into a building and the contained cables must be distributed. Terminal enclosures couple to the ends of microducts and provide a location for cables to be organized. Terminal enclosures are typically configured to couple to the microduct ends such that they cannot be unintentionally removed. In some cases, this coupling can be provided by some form of a hose clamp or end clamp. Such clamps generally require significant user input to operate, and in many instances require the use of tools. In addition to requiring a significant amount of time to operate, this also leads to potential issues such as over- or under-tightening the clamps and over- or under-inserting the microducts.

SUMMARY

Embodiments of the invention are directed to, among other things, systems and devices for terminating microducts. According to one aspect, a microduct coupling system is provided. The coupling system includes a support structure with a first side and a second side opposite from the first side. The coupling system also includes multiple couplers configured to receive corresponding multiple microducts on the first side of the support structure. Each of the couplers includes a wall connected to the support structure. The wall defines a cavity for receiving an end of a corresponding microduct and provides an opening into the cavity on the first side of the support structure for the corresponding microduct. Each coupler also has a retention member and a sealing member. The retention member is configured to removably retain the end of the corresponding microduct within the cavity. The sealing member is configured to provide a seal between the wall and the corresponding microduct within the cavity.

A microduct port adapter is provided according to another aspect of the invention. The port adapter has a base unit and a cover hingedly coupled to the base unit for covering the interior of the base unit. The base unit includes a bottom wall having a first end and a second end, a first side wall extending between the first end and the second end, a second side wall extending between the first end and the second end, at least one cable port at the first end, and a support structure coupled at the second end of the base unit. The support structure has a first side facing out away from the base unit and a second side facing an interior of the base unit. The support structure also has a plurality of couplers configured to receive and removably retain a corresponding plurality of microducts on the first side of the support structure.

According to another aspect of the invention, a microduct coupling panel is provided. The coupling panel includes a frame, a perimeter, and multiple couplers. The frame has a generally planar configuration with a first side and a second side opposite from the first side. The perimeter is configured to removably couple with a corresponding coupling portion of at least one of a terminal enclosure and a port adaptor. The couplers are connected to the frame in a grid arrangement. Each of the couplers has a wall that defines a cavity for receiving an end of a corresponding microduct. Each coupler provides an opening into the cavity on the first side of the frame for the corresponding microduct, and also provides an exit opening in the cavity on the second side of the frame for a cable within the corresponding microduct to exit the cavity. Each coupler also includes a retention member configured to removably retain the end of the corresponding microduct within the cavity and a sealing member configured to provide a seal between the wall and the corresponding microduct within the cavity.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

FIG. 3 is an exploded view of a microduct coupling system.

FIG. 4A is a perspective view of a retention member of the microduct coupling system of FIG. 3.

FIG. 4B is a side view of the retention member of FIG. 4A.

FIG. 8A is a front perspective view of a microduct port adapter.

FIG. 8B is a rear perspective view of the microduct port adapter of FIG. 8A.

FIG. 8C is a front perspective view of the microduct port adapter of FIG. 8A in an open configuration.

FIG. 8D is a rear perspective view of the microduct port adapter of FIG. 8A with a top housing portion removed.

DETAILED DESCRIPTION

Figure 1:
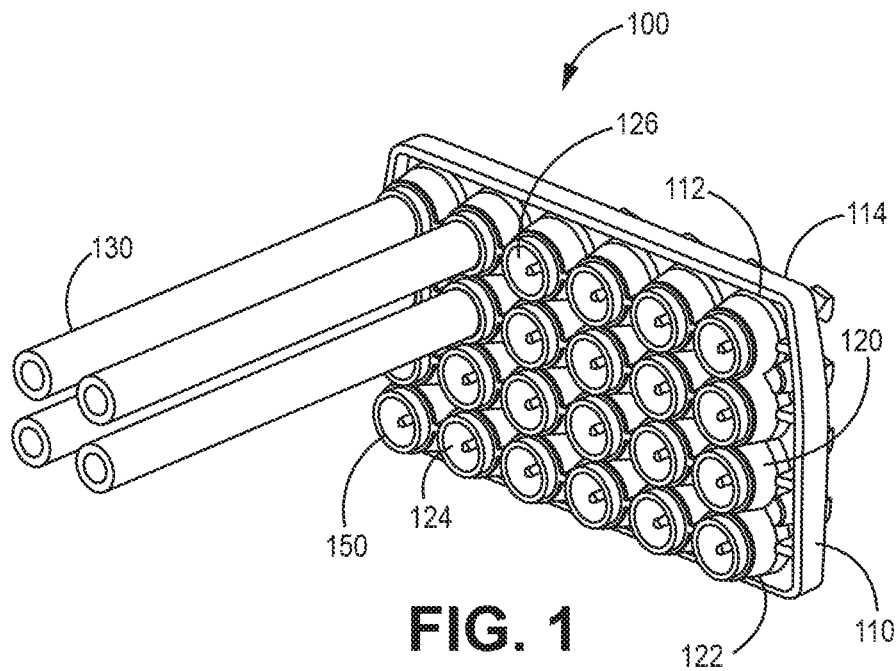
FIG. 1 is a front perspective view of a microduct coupling system and a plurality of microducts coupled thereto.

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Examples of microduct coupling devices, systems, and methods are described herein and can be used to terminate one or more microducts, such as at a communications network distribution point. In one example, a grid of microduct couplers, provided in the form of press fit connectors, is arranged on a panel. A microduct is coupled to the device by inserting the end of the microduct into an opening of one of the couplers. In some cases the microduct may be inserted until it cannot move further into the coupler opening. In this manner, the panel of microduct couplers can be populated with a desired number of microducts. In some cases, plugs are provided to close and/or seal unused coupler openings. Two possible features and/or benefits of such a microduct coupling system is that inserting the microducts and plugs into the couplers of the panel can in some cases be accomplished without tools and in little time. In such cases, the microducts can also be quickly removed from the couplers without the use of tools. In some cases a user only needs to push a retention member inward while pulling the microduct out of the coupler. One result is that a microduct coupling system that includes a collection of couplers can be easily and reliably configured with a desired number of microducts and plugs in a short amount of time.

The term "termination" is used within the present disclosure with respect to microducts to mean securely providing an endpoint of a microduct. As one example, a microduct may be considered to be terminated when an end of the microduct is fixed in space by some structure and/or mechanism. The microduct thus stops at this point and does not continue on past the mechanism/structure. The term "coupling" is used herein to refer to the act of securing an end of a microduct to such a structure and/or mechanism, and the term "coupler" is thus used to refer to a device or component that is capable of providing this securing functionality. In some cases a microduct can be removably coupled with a coupler in order to secure the end of the microduct while retaining the ability to remove it as well.

Some implementations of the invention involve the use of a microduct coupling panel to terminate one or more microducts at a terminal enclosure. In such cases, the microducts typically form a seal with one or more elements of the coupler so that the environment of the exterior of the microduct is not in communication with the environment inside the enclosure. In some cases the seal may be a substantially weather tight seal. As used herein, a substantially weather tight seal is a seal that restricts the entrance of water during falling rain, wind driven rain, and salt fog test procedures common in the industry, within limits, tolerances, and/or deviations acceptable, practiced, and known in the art.

While the microducts terminate at the terminal enclosure, a passage extending through the microduct into the terminal enclosure is provided for any cables that are routed through the microduct. The cables can then be routed from the distribution point at the terminal enclosure to different points within one or more networks. Accordingly, in some cases a terminal enclosure provides an enclosed space for a network junction or distribution point at which one or more cables can exit or enter one or more protective microducts without being exposed to the ambient environment.

FIG. 1 is a front perspective view of one implementation of a microduct coupling system. In this example, the coupling system is configured as a microduct coupling panel 100. The coupling panel 100 is configured to couple to and terminate a plurality of microducts 130. The panel 100 includes a support structure 110 that has a first side 112 and a second side 114. In this implementation, several couplers 120 are arranged about the support structure in a grid pattern. Each coupler 120 has a wall 122, which is connected to the support structure. Each wall 122 defines a cavity 124 of the coupler 120. The cavity 124 has an entrance opening 126 on the first side 112 and an exit opening 128 (shown in FIG. 2) on the second side 114 of the support structure 110. Each coupler 120 also includes a retention member 150, which is positioned within the cavity 124 of the coupler 120. The entrance opening 126 of the cavity is configured to receive the retention member 150, and the retention member 150 is configured to receive an end of one of the microducts 130 within the cavity 124. In this particular example, the couplers 120 have entrance openings 126 and exit openings 128 that are circular, but examples where the openings have other shapes are possible.

In the illustrated implementation, the retention members 150 are disposed in the cavities 124, and protrude to an extent from the entrance openings 126. The retention members 150 optionally have generally the same outer cross sectional shape as the entrance openings from which they protrude. The inner cross sectional shape of the retention members 150 is typically configured to correspond with the size(s) and shape(s) of the microducts being coupled to the panel 100. In this particular example, the inner and outer cross sectional shapes of retention members 150 are both circular, and are thus insertable through the circular entrance openings 126, and can further accept circular microducts.

Continuing with reference to FIG. 1, the clean cut ends of the microducts 130 are inserted into, and in some cases through, the retention members 150 as the microduct ends are inserted through the entrance openings 126 and into the cavities 124 of the couplers 120 from the first side 112 of the panel 100. A sealing member provided with each coupler 120 (not shown in FIG. 1), creates a seal between one of the microducts 130 and the wall 122 of the coupler 120.

Each of the retention members 150 is configured to removably retain an end of a microduct within the cavity 124 of the coupler 120. A microduct 130 can be optionally removed by moving the retention member further into the cavity 124 while pulling the microduct in the opposite direction away from the entrance opening. In some cases the microducts 130 are not allowed to move outward if the retention members 150 are not so manipulated. In some cases one or more of the retention members 150 may optionally be implemented as collets, and the act of moving the retention member inward may be referred to as "pushing the collet inward." In some cases the couplers 120 may be referred to as "push fit connectors."

In the example illustrated in FIG. 1, the panel 100 optionally includes twenty-four couplers 120 of the same size, arranged in a symmetrical grid pattern. Many variations of sizes, shapes, numbers, and arrangements of couplers are contemplated, and thus implementations of the invention are not restricted to the depicted examples. As just some possible examples, some microduct coupling panels may optionally include couplers of different sizes and/or shapes in order to accommodate various types of corresponding microducts. In addition, the arrangement of microduct couplers within a panel or other microduct coupling system need not be symmetrical, and may instead be asymmetrical, partly symmetrical, or not having any recognizable arrangement whatsoever.

The microduct coupling panel 100 is a type of microduct coupling system. A panel 100 may also be used as a subsystem of a larger microduct coupling system. The support structure 110 and the walls 122 of a microduct coupling panel may be formed as a single part, in some examples. In other examples, they may be formed from multiple parts which are attached through the use of fasteners, adhesives, weldments, or any other means of joining parts.

Figure 2:
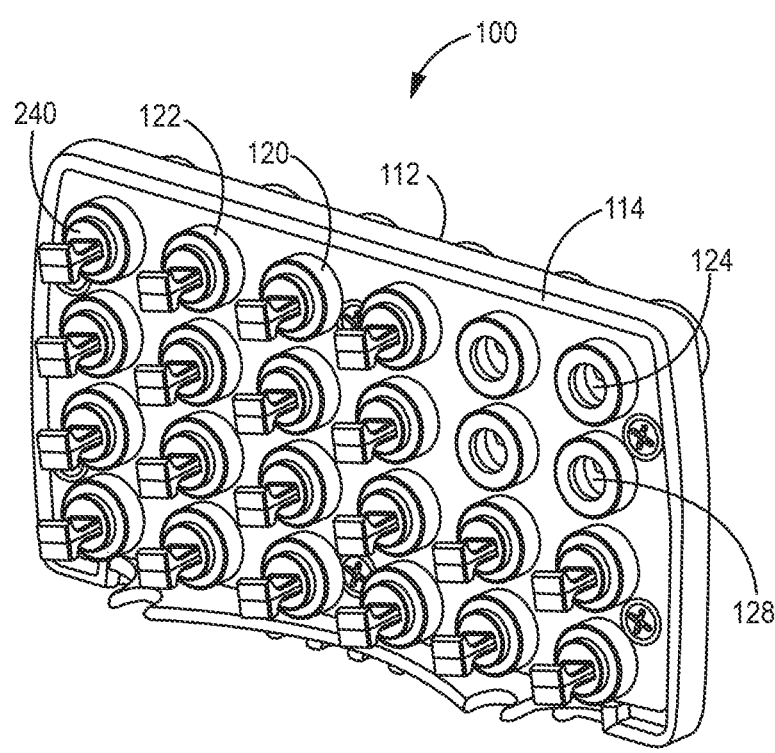
FIG. 2 is a rear perspective view of the microduct coupling system of FIG. 1 without the plurality of microducts and including a plurality of plugs.

FIG. 2 shows the second side 114 of the microduct coupling panel 100 of FIG. 1. An opening in each of the cavities 124 on the second side 114 forms an exit opening 128. The exit openings 128 are sized and configured to allow the cable(s) or other contents of the microducts 130 to pass there through. For example, microducts may be used to route fiber optic cables, telephone cables, coaxial cables, and/or other types of telecommunication cables. The embodiments of the invention are not limited to routing any particular type of cable or other matter within the microducts and it should be appreciated that many variations are possible. Plugs 240 are configured to be inserted into the cavities 124 through the exit openings 128. The plugs 240 provide a seal between the environments of the second side 114 and the first side 112 for couplers that are not occupied by a microduct.

FIG. 3 shows an exploded view of a microduct coupling panel 300. The panel 300 is configured to couple to and terminate a plurality of microducts. The panel 300 includes a frame 310, which has a first side 312 and a second side 314. In this example, the frame 310 has two parts, namely, a first part 316 and second part 318. Multiple couplers 320 are arranged about the frame in a grid pattern. The couplers 320 each have a wall 322 that defines a cavity 324. As shown in FIG. 3, each wall 322 has a first portion 332 connected to the first side 312 of the frame and a second portion 334 connected to the second side 314 of the frame. Each wall 322 also defines an entrance opening 326 on the first portion 332 and an exit opening 328 on the second portion 334.

The retention members 350 are configured to be inserted into the cavities 324 through the entrance openings 326. Sealing members 370 are configured to be disposed in the cavities 324 between the two parts 332 and 334 of the wall. The sealing members 370 are secured in place when the parts 316 and 318 of the frame 310 are assembled. In some examples, the sealing members 370 are provided as elastomeric O-rings.

In the depicted implementation, the frame 310 is generally planar in shape, with the first and second sides generally forming opposite faces of the plane. A perimeter 380 of the frame 310 extends about the sides of the panel, defining an outer extent of the panel. In some examples, the perimeter 380 is configured to removably couple with a corresponding coupling portion of a terminal enclosure, port adaptor, or other structure. In some examples, the perimeter 380 is configured to permanently couple with the aforementioned structures.

FIG. 4A is a perspective view of the retention member 350 shown in FIG. 3. The retention member 350 has a lip 400 and arms 402. Protrusions 404 are formed on the arms 402. The retention member 350 is configured to operate as a compliant mechanism, with the arms deforming and relaxing in order to provide a desired force to an inserted microduct.

The retention member is configured to removably retain the clean cut end of a microduct within a cavity of a microduct coupler of a microduct coupling panel, system, port adapter, or other device. In some examples, the retention member 350 is generally circular in cross section and provides a close fit with a correspondingly sized, circular microduct. In some examples, the retention member 350 comprises a polymeric material with elastic properties selected to deform a desired amount without requiring an excessive force input.

FIG. 4B is a side view of the retention member 350. The protrusions 404 are configured to interfere with the first portion 332 of the wall 322 shown in FIG. 3. The arms 402 are configured to deform such that the protrusions are able to be inserted into the cavity 324 through the entrance opening 326 of the coupling panel 300 of FIG. 3. The lip 400 is configured to be substantially rigid, and thereby unable to be inserted into the cavity 324 through an entrance opening. This provides a limit to the retention member's inward travel.

Figure 5A:
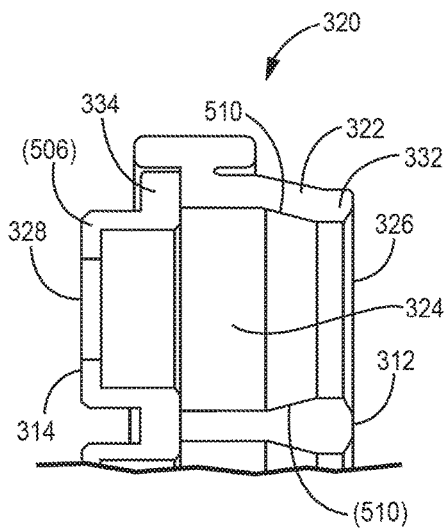
FIG. 5A is a side section view of a microduct coupler forming part of a microduct coupling system.

FIG. 5A is a side section view of one of the microduct couplers 320. The coupler 320 has a wall 322, which includes the first portion 332 and the second portion 334. The wall 322 defines the cavity 324, into which retention member and microduct will be inserted. The first wall portion 332 defines the entrance opening. The second wall portion 334 defines an exit opening 328. In this implementation, the exit opening 328 is characterized by a smaller inner width (e.g., diameter in this case) than the entrance opening 326.

Figure 5B:
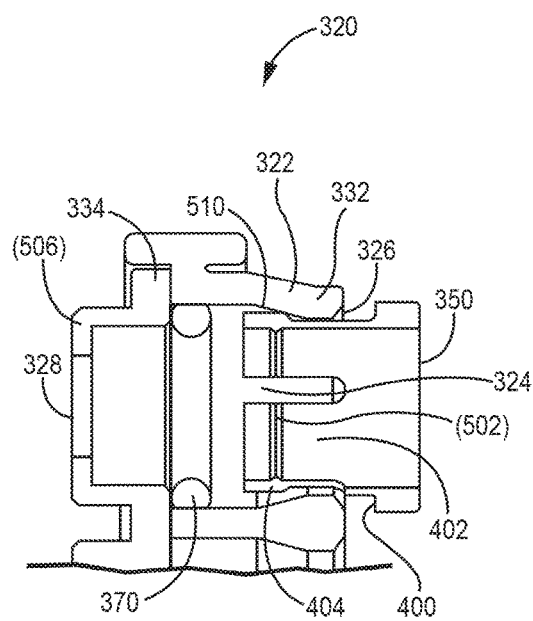
FIG. 5B is a side section view of the microduct coupler of FIG. 5A, illustrating a retention member and a sealing member positioned within the microduct coupler.

FIG. 5B is a side section view of one of the microduct couplers 320, with a retention member 350 inserted and a sealing member 370 disposed therein. The retention member protrusions 404 have an outer diameter larger than the diameter of the entrance opening 326. Deformation of the arms 402 is necessary for the retention member 350 to be inserted into the cavity 324, thus requiring a substantial force to be exerted upon insertion. The inserted retention member 350 is then retained by interferences between the protrusions 404 and interference face 510, and between the lip 400 and the edge of entrance opening 326. The retention member has a limited amount of fore and aft translational travel, or play, along its axis. Internal teeth 502 are provided as radial protrusions along the inside surface of the arms 402 of the retention member 350.

Figure 5C:
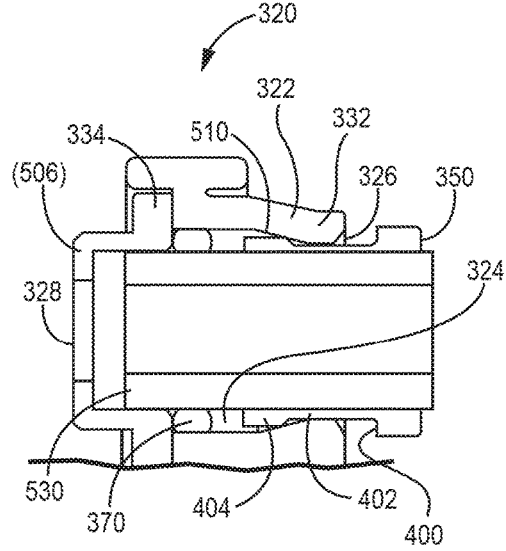
FIG. 5C is a side section view of the microduct coupler of FIG. 5B, illustrating a microduct coupled thereto.

FIG. 5C is a side sectional view of the microduct coupler assembly of FIG. 5B with a microduct end 530 inserted therein. The second portion 334 and the exit opening 328 define a shoulder 506. Because the diameter of the exit opening 328 is smaller than the outer diameter of the microduct 530, the shoulder 506 interferes with the microduct and provides a travel limit. The coupler 320 is configured to align the microduct 530 with the exit opening 328. The microduct 530 is terminated by coupler 320.

The inserted microduct 530 creates an interference fit with sealing member 370, thereby compressing it and creating a seal, which in some cases may be substantially weather tight, liquid impermeable, and/or gas impermeable. Accordingly, the seal effectively isolates the environment of the exit opening 328 from that of the entrance opening 326.

The inserted microduct 530 creates an interference fit with the internal teeth 502. This causes an outward deflection of the arms 402. If tension is applied to the microduct 530 in the direction of the first side 322, this force is applied to retention member 350 through friction between the microduct 530 and the teeth 502. As the retention member 350 translates toward the entrance opening 326, the outward deflection of the arms 402 engages the protrusions 404 with the decreasing diameter of interference face 510 and increases the clamping force on the microduct 530. The increased clamping force causes an increased friction force, thereby preventing the microduct 530 from escaping the coupler.

The microduct 530 may be removed from the coupler 320 by contemporaneously applying tension to the microduct 530 and further inserting the retention member 350 into the cavity 324. By further inserting the retention member 350 into cavity 324, interference face 510 no longer interferes with protrusions 404. In the absence of interference, arms 402 are relaxed. The relaxation of arms 402 causes the friction force between the ridge 502 and the microduct 530 to be reduced enough that the microduct can slide freely through the retention member 350. This design is advantageous as it allows a user to insert and remove microducts without using tools. This enables the user to install microducts quickly and with a negligible chance of error. A user simply pushes the microduct 530 inward until it is stopped by the shoulder 506.

Figure 6A:
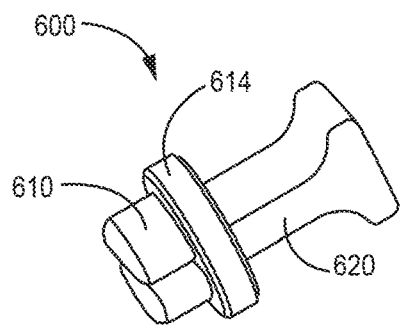
FIG. 6A is a perspective view of a microduct coupler plug.

FIG. 6A shows a perspective view of a plug 600. The plug 600 has a protruding region 610, a rim 614, and a handle 620. The protruding region 610 is configured to be inserted into an exit opening of a microduct coupler. The rim is configured to limit the distance the plug 600 may be inserted into an exit opening. The handle 620 is configured to facilitate the insertion and removal of the plug 600. In some examples, the plug 600 is formed from an elastomeric polymer.

Figure 6B:
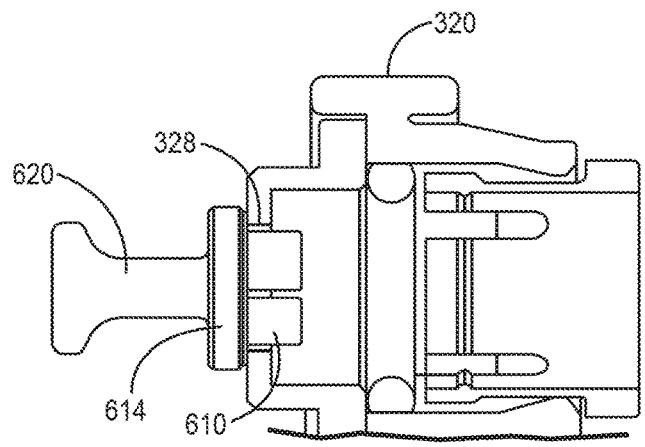
FIG. 6B is a side section view of the microduct coupler plug of FIG. 6A disposed within a microduct coupler assembly.

FIG. 6B shows a side section view of the plug 600 in use with the microduct coupler 320. The protruding region 610 is inserted into the exit opening 328. An interference fit between the protruding region 610 and the exit opening 328 causes sufficient friction to retain the plug 600 in its position. In some implementations the interference fit provides a substantially weather tight seal.

Figure 6C:
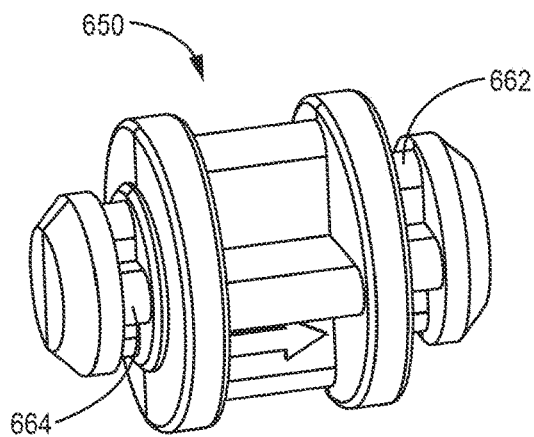
FIG. 6C is a perspective view of another a microduct coupler plug.

FIG. 6C shows a perspective view of a double sided plug 650 provided according to some implementations of the invention. Plug 650 has a central core 660. A first protrusion 662 and a second protrusion 664 extend from opposite ends of the core 660. The central core 660 has a larger width (e.g., diameter in this case) than the first and second protrusions 662 and 664. The protrusions 662 and 664 are each configured to be inserted into an exit opening of a microduct coupler. The first protrusion 662 has a different diameter than the second protrusion 664. This allows the same plug 650 to be compatible with microduct couplers having different exit opening diameters. This advantageously allows one using the product to require fewer part types in his or her inventory while maintaining the utility of two different plugs.

Figure 7:
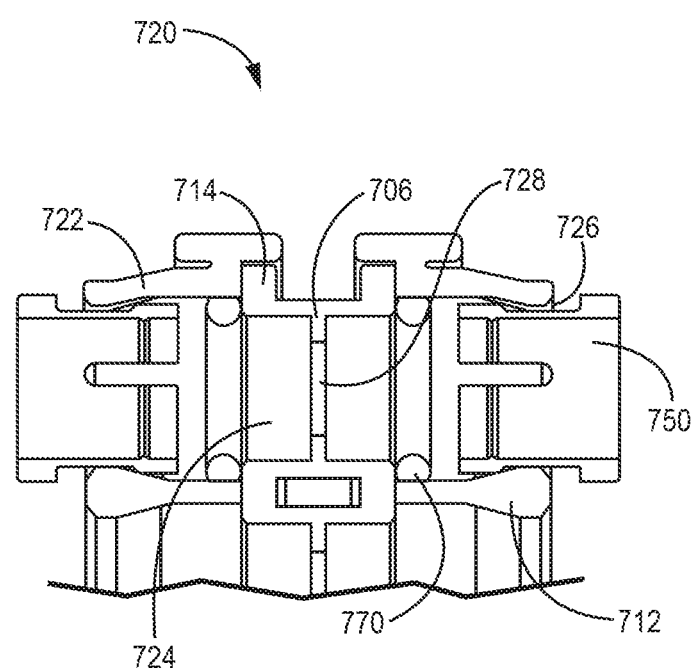
FIG. 7 is a side section view of a microduct coupler assembly forming part of a microduct coupling system.

FIG. 7 shows a side section view of another microduct coupler 720 including some optional features. In this example, the coupler 720 is a double ended coupler configured to terminate two microducts. The coupler 720 has a central inner region 714 and peripheral outer regions 712. The coupler 720 has a wall 722, which defines a cavity 724. The wall 722 also defines a shoulder 706, an entrance opening 726, and a central orifice 728. The retention members 750 are disposed in the cavity 724, and protrude from each entrance opening 726. The sealing members 770 are disposed in the cavity 724 between the inner region 714 and each outer region 712.

The entrance openings 726, the retention members 750, the sealing members 770, and the central orifice 728 are oriented about a common axis. The coupler 720 is thus configured to accept the clean cut ends of two microducts, align them, and couple them.

FIG. 8A shows a perspective view of a microduct coupling system 800. The coupling system 800 has a microduct port adapter 802. The port adapter has a base unit 804. The base unit 804 has a bottom wall 810, and the bottom wall has a first end 812 and a second end 814. A first side wall 816 and a second side wall (not shown in FIG. 8A) extend between the first end 812 and the second end 814 of the bottom wall 810. The port adapter 802 has a cover 830 that is coupled to the base unit 804 for covering the interior of the base unit. In some examples, the cover 830 is secured to the base unit 804 through the use of a locking device 834. The port adapter 802 has a microduct coupling panel 840. The panel 840 is configured to couple to a plurality of microducts. For example the panel 840 may optionally be configured as one of the panels discussed herein.

FIG. 8B shows a back perspective view of the microduct coupling system 800 of FIG. 8A. A second sidewall 818 is visible from this view. The base unit 804 has cable ports 820 on the side of the first end 812 of the bottom wall. The cable ports 820 give the contents of one or more microducts a passage through which they can enter a terminal enclosure or other structure. Hinge 832 is configured to hingedly attach the cover 830 to the base unit 804. The cover 830 may be opened to allow access to the interior of the port adapter 802.

FIG. 8C shows a perspective view of the microduct coupling system 800 of FIG. 8A in an open configuration. The locking device 834 is disabled and the cover 830 is open. This allows for a user to access the interior of the port adapter 802. In some embodiments, the panel 840 is removably mounted to the port adapter 802 and can be removed or replaced while the system is in an open configuration. For example, the port adapter 802 may optionally include a coupling portion configured to removably couple with the perimeter of the panel 840. In this implementation the interior surface of the cover 830 provides a first channel 850 that fits about the top edge 852 of the panel 840 when the cover 830 is closed. The base unit 804 provides a similar channel at the second end 814 that provides a slot or groove into which the panel 840 can be inserted.

FIG. 8D shows a back perspective view of the coupling system 800 of FIG. 8A with the cover 830 removed. In this depicted implementation, the cable ports 820 have channels 821 the which are configured to accept port caps (e.g., similar to the optional channels that receive the panel 840). For example, a port cap can be placed inside one or more of the channels 821 if the corresponding cable port 820 is not in use. In some cases the cable ports are configured to accept one or more of a variety of port caps, seals, grommets, and/or couplers. The base wall 810 has flanged portions 824 located on the first side 812. These flanged portions 824 are configured to be secured to a terminal enclosure, thereby allowing the microduct port adapter 802 to be mated to a terminal enclosure.

Figure 9A:
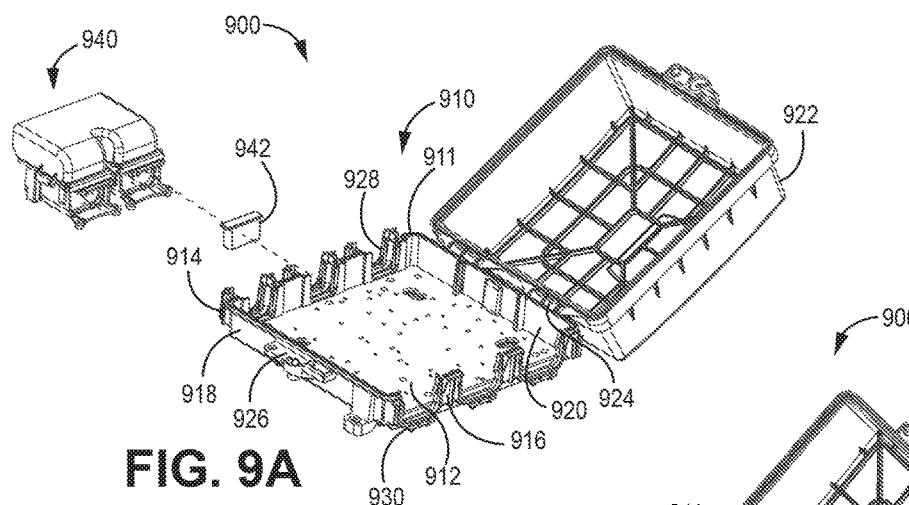
FIG. 9A is an exploded view of a terminal enclosure system including a microduct port adapter.

FIG. 9A shows an exploded view of a microduct coupling system 900. The microduct coupling system 900 has a terminal enclosure 910, a microduct port adapter 940, and optional port caps 942. The port adapter 940 can be any of the port adapters described herein, wherein the port adapters include any of the microduct coupling panels described herein.

The terminal enclosure 910 has a base unit 911. The base unit 911 has a bottom wall 912, and the bottom wall 912 has a first end 914 and a second end 916. A first side wall 918 and a second side wall 920 extend between the first end 914 and the second end 916 of the bottom wall 912. The terminal enclosure further has a cover 922 that is coupled to the side walls. Cover 922 is connected to the second side wall 920 by a hinge 924 and is connectable to second side wall 918 by a locking device 926. Additional side walls span the distance between the first and second side walls and run along the first end 914 and second end 916 of the base. The wall on the first end defines a set of first terminal cable ports 928. The wall on the second end defines a set of second end cable ports 928. The terminal cable ports 928 and 930 are configured to mate with one or more port adapters 940, and are configured to mate with the terminal cable ports of other terminal enclosures. The optional port caps 942 are configured to be seated in unused cable ports of the port adapter 940 and create a seal when seated therein.

Figure 9B:
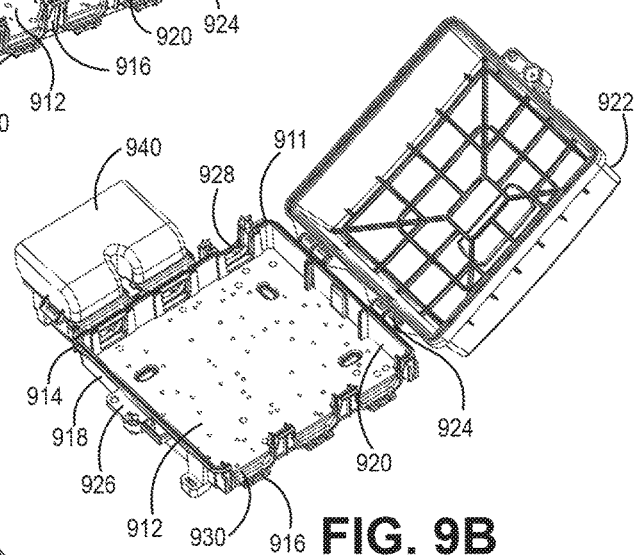
FIG. 9B is a perspective view of the terminal enclosure system of FIG. 9A.

FIG. 9B shows a perspective view of the assembled microduct coupling system 900 of FIG. 9A. The port adapter 940 forms an optional substantially weather tight seal with the terminal enclosure 910. Port caps 942 can be placed in unused cable ports 928 and 930 in order to separate the interior of the enclosure from the ambient environment when the cover is closed.

Figure 10:
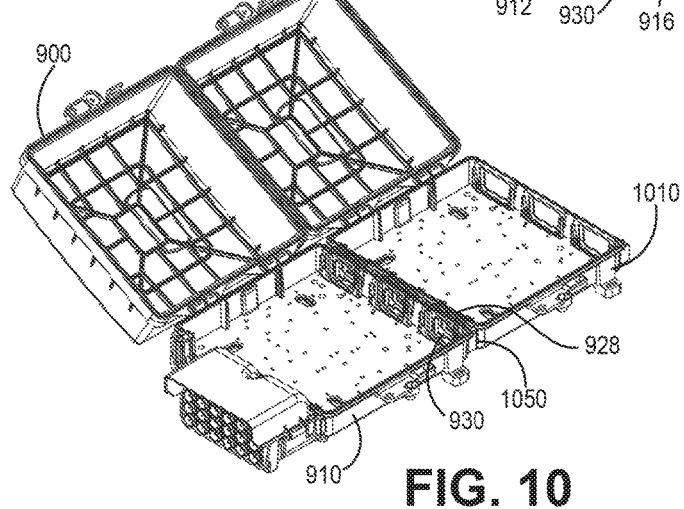
FIG. 10 is a perspective view of a terminal enclosure system including a microduct port adapter.

FIG. 10 shows a perspective view of a microduct coupling system 1000 that includes the microduct coupling system 900 of FIGS. 9A and 9B, and further includes a second terminal enclosure 1010. The second terminal cable ports 930 of the second terminal enclosure 1010 are mated with the first terminal cable ports 928 of the first terminal enclosure 910. Grommets 1050 are used to provide a seal between the two terminal enclosures while allowing cables and fibers to pass between.

Figure 11:
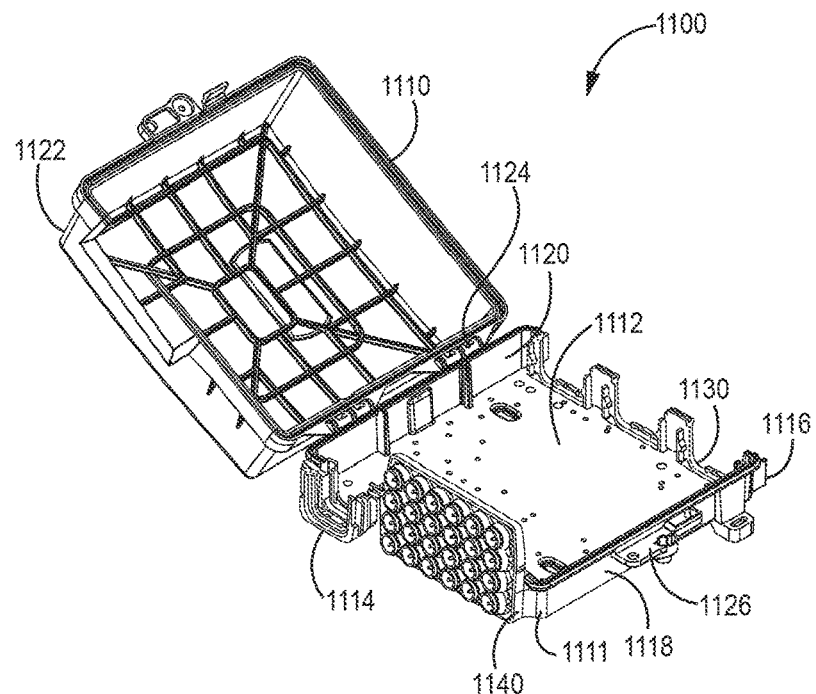
FIG. 11 is a perspective view of a terminal enclosure system including a microduct coupling panel.

FIG. 11 shows a perspective view of a microduct coupling system 1100. The coupling system 1100 has a terminal enclosure 1110 and a microduct coupling panel 1140. The terminal enclosure 1110 has a base unit 1111 and a cover 1122. The base unit 1111 has a bottom wall 1112, and the bottom wall 1112 has a first end 1114 and a second end 1116. A first side wall 1118 and a second side wall 1120 extend between the first end 1114 and the second end 1116 of the bottom wall 1112. The cover 1122 is connected to the second side wall 1120 by a hinge 1124 and is connectable to second side wall 1118 by a locking device 1126.

The microduct coupling panel 1140 can be any of the microduct coupling panels described herein. In this example, the coupling panel 1140 is mounted on the terminal enclosure such that it forms an integral part of a wall of the enclosure. In configurations such as this, the microduct coupling panel may be referred to as a wall interface. In some examples, the panel 1140 is removably mounted to the base unit 1111. For example, the terminal enclosure 1110 may optionally provide a coupling portion configured to removably couple with the perimeter of the panel 1140. In some implementations, the coupling portion includes a channel or slot in the base unit wall to receive the bottom portion of the coupling panel 1140 and another channel in the cover wall that fits about the top edge of the panel 1140 in a manner that is similar to the channels provided by the port adapter 802 illustrated in FIGS. 8A-8D. In such examples, the panel is typically removable when the cover is in an open configuration, and is secured when the cover is in a closed configuration.

Figure 12:
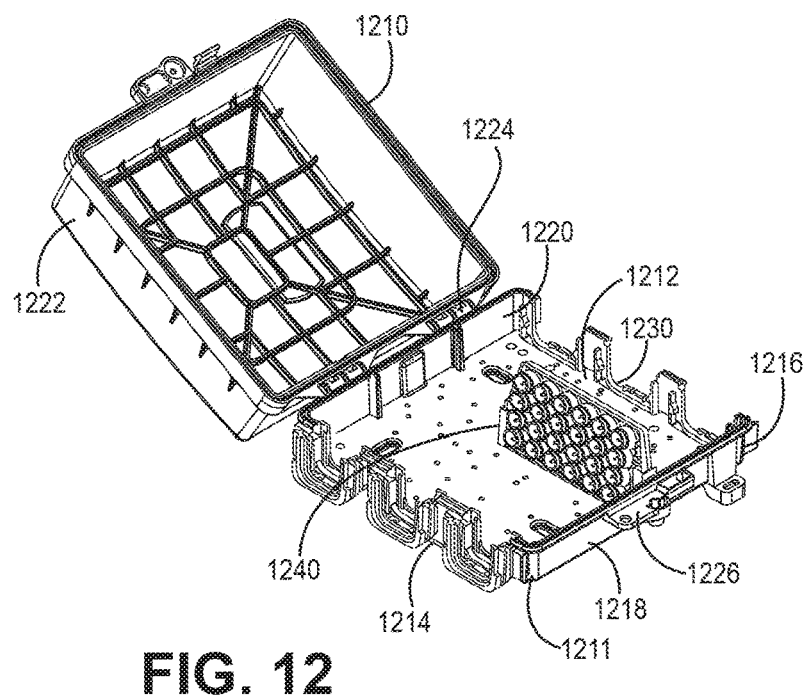
FIG. 12 is a perspective view of a terminal enclosure system including a microduct coupling panel.

FIG. 12 shows a perspective view of a microduct coupling system 1200. The coupling system 1200 has a terminal enclosure 1210 and a microduct coupling panel 1240. The terminal enclosure 1210 has a base unit 1211 and a cover 1222. The base unit 1211 has a bottom wall 1212, and the bottom wall 1212 has a first end 1214 and a second end 1216. A first side wall 1218 and a second side wall 1220 extend between the first end 1214 and the second end 1216 of the bottom wall 1212. The cover 1222 is connected to the second side wall 1220 by a hinge 1224 and is connectable to second side wall 1218 by a locking device 1226.

The microduct coupling panel 1240 can be any of the microduct coupling panels described herein. In this example, the coupling panel 1240 is mounted on the interior of terminal enclosure. In configurations such as this, the microduct coupling system may be referred to as an interiorly mounted coupling system. In some examples, the panel 1240 is removably mounted to the base unit 1211. In such examples, the panel is typically removable when the cover is in an open configuration, and is secured when the cover is in a closed configuration.

Thus, some embodiments and implementations of the invention are disclosed. One skilled in the art will appreciate that various changes, adaptations, and modifications may be made. Some examples of various aspects and implementations of an embodiment will now be described. One general aspect of the invention includes a microduct coupling system, including: a support structure having a first side and a second side opposite from the first side. The microduct also includes a plurality of couplers configured to receive a corresponding plurality of microducts on the first side of the support structure. The microduct also includes where each coupler includes a wall connected to the support structure, where the wall defines a cavity for receiving an end of a corresponding microduct and provides an opening into the cavity on the first side of the support structure for the corresponding microduct. The microduct also includes where each coupler further includes a retention member configured to removably retain the end of the corresponding microduct within the cavity. The microduct also includes where each coupler further includes a sealing member configured to provide a seal between the wall and the corresponding microduct within the cavity.

Implementations of this aspect may optionally include one or more of the following. The microduct coupling system where the retention member includes a first end with one or more protrusions inside the cavity, and where, with the corresponding microduct received in the cavity, the one or more protrusions are configured to engage the wall to prevent the retention member and the corresponding microduct from exiting the cavity. The microduct coupling system where the sealing member includes an O-ring that provides a substantially weather tight seal between the wall and the corresponding microduct within the cavity. The microduct coupling system where the opening into the cavity is an entrance opening and where the wall further provides an exit opening in the cavity on the second side of the support structure for a cable within the corresponding microduct to exit the cavity. The microduct coupling system further including a plug that fits within the exit opening to close off access to the cavity from the second side of the support structure. The microduct coupling system where the wall includes a first portion that provides the entrance opening and a separable second portion that provides the exit opening, where separation of the first portion and the second portion provides access to the sealing member within the cavity. The microduct coupling system where the support structure includes a first part that connects together the first portions of the walls of the plurality of couplers, and a second part that connects together the second portions of the walls of the plurality of couplers, and where the first and second parts of the support structure are fastened together to form the plurality of couplers. The microduct coupling system where the support structure includes a portion of an exterior wall of a terminal enclosure or a port adapter for a terminal enclosure.

Another implementation includes the microduct coupling system where the support structure forms a panel configured to be removably mounted to at least one of a port adapter and a terminal enclosure, as at least one of an exterior wall interface and an interiorly mounted coupling system for the plurality of microducts. The microduct port adapter can be implemented in one of the following manners or another: The microduct coupler can be configured so that each coupler includes a wall connected to the support structure, where the wall defines a cavity for receiving an end of a corresponding microduct and provides an opening into the cavity on the first side of the support structure for the corresponding microduct. The microduct port adapter may also include where each coupler further includes a retention member configured to removably retain the end of the corresponding microduct within the cavity. The microduct port adapter may also include where each coupler further includes a sealing member configured to provide a seal between the wall and the corresponding microduct within the cavity. The microduct port adapter further including a third side wall at the second end of the base unit coupled between the first and the second side walls and opposite the at least one cable port at the first end, the third side wall including the support structure and the plurality of couplers configured to receive and removably retain the corresponding plurality of microducts. The microduct port adapter further including a removable panel at the second end of the base unit removably coupled between the first and the second side walls and opposite the at least one cable port at the first end, the removable panel including the support structure and the plurality of couplers configured to receive and removably retain the corresponding plurality of microducts. The microduct port adapter where the at least one cable port at the first end of the base unit is configured to connect to a corresponding cable port of a terminal enclosure. The microduct port adapter where each of the couplers has an exit opening, and further including a plurality of plugs that fit into exit openings of the plurality of couplers.

In another implementation the microduct port adapter is configured to include a removable coupling panel. Implementations of such a panel include: The microduct coupling panel where the wall includes a first portion that provides the entrance opening and a separable second portion that provides the exit opening, where separation of the first portion and the second portion provides access to the sealing member within the cavity. The microduct coupling panel where the frame includes a first part that connects together the first portions of the walls of the plurality of couplers, and a second part that connects together the second portions of the walls of the plurality of couplers, and where the first and second parts of the support structure are fastened together to form the plurality of couplers.

One general aspect of the invention includes a microduct port adapter, including: a base unit including. The microduct port adapter also includes a bottom wall having a first end and a second end. The microduct port adapter also includes a first side wall extending between the first end and the second end. The microduct port adapter also includes a second side wall extending between the first end and the second end. The microduct port adapter also includes at least one cable port at the first end. The microduct port adapter also includes a support structure coupled at the second end of the base unit, the support structure having a first side facing out away from the base unit and a second side facing an interior of the base unit. The microduct port adapter also includes a plurality of couplers configured to receive and removably retain a corresponding plurality of microducts on the first side of the support structure. The microduct port adapter also includes a cover hingedly coupled to the base unit for covering the interior of the base unit.

Implementations of this aspect may optionally include one or more of the following. The microduct port adapter where each coupler includes a wall connected to the support structure, where the wall defines a cavity for receiving an end of a corresponding microduct and provides an opening into the cavity on the first side of the support structure for the corresponding microduct. The microduct port adapter may also include where each coupler further includes a retention member configured to removably retain the end of the corresponding microduct within the cavity. The microduct port adapter may also include where each coupler further includes a sealing member configured to provide a seal between the wall and the corresponding microduct within the cavity. The microduct port adapter further including a third side wall at the second end of the base unit coupled between the first and the second side walls and opposite the at least one cable port at the first end, the third side wall including the support structure and the plurality of couplers configured to receive and removably retain the corresponding plurality of microducts. The microduct port adapter further including a removable panel at the second end of the base unit removably coupled between the first and the second side walls and opposite the at least one cable port at the first end, the removable panel including the support structure and the plurality of couplers configured to receive and removably retain the corresponding plurality of microducts. The microduct port adapter where the at least one cable port at the first end of the base unit is configured to connect to a corresponding cable port of a terminal enclosure. The microduct port adapter where each of the couplers has an exit opening, and further including a plurality of plugs that fit into exit openings of the plurality of couplers.

In another implementation the microduct port adapter is configured to include a removable coupling panel. Implementations of such a panel include: The microduct coupling panel where the wall includes a first portion that provides the entrance opening and a separable second portion that provides the exit opening, where separation of the first portion and the second portion provides access to the sealing member within the cavity. The microduct coupling panel where the frame includes a first part that connects together the first portions of the walls of the plurality of couplers, and a second part that connects together the second portions of the walls of the plurality of couplers, and where the first and second parts of the support structure are fastened together to form the plurality of couplers. international claim set:

One general aspect of the invention includes a microduct coupling panel, including: a frame having a generally planar configuration with a first side and a second side opposite from the first side. The microduct also includes a perimeter configured to removably couple with a corresponding coupling portion of at least one of a terminal enclosure and a port adaptor. The microduct also includes a plurality of couplers connected to the frame in a grid arrangement. The microduct also includes where each of the plurality of couplers includes a wall defining a cavity for receiving an end of a corresponding microduct, provides an opening into the cavity on the first side of the frame for the corresponding microduct, and provides an exit opening in the cavity on the second side of the frame for a cable within the corresponding microduct to exit the cavity. The microduct also includes where each coupler further includes a retention member configured to removably retain the end of the corresponding microduct within the cavity. The microduct also includes where each coupler further includes a sealing member configured to provide a seal between the wall and the corresponding microduct within the cavity.

Implementations of this aspect may optionally include one or more of the following. The microduct coupling panel where the wall includes a first portion that provides the entrance opening and a separable second portion that provides the exit opening, where separation of the first portion and the second portion provides access to the sealing member within the cavity. The microduct coupling panel where the frame includes a first part that connects together the first portions of the walls of the plurality of couplers, and a second part that connects together the second portions of the walls of the plurality of couplers, and where the first and second parts of the support structure are fastened together to form the plurality of couplers.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A microduct coupling system, comprising:
    a support structure having a first side and a second side opposite from the first side; and
    a plurality of couplers configured to receive a corresponding plurality of microducts on the first side of the support structure;
    wherein each coupler comprises a wall connected to the support structure, wherein the wall defines a cavity for receiving an end of a corresponding microduct and provides an opening into the cavity on the first side of the support structure for the corresponding microduct;
    wherein each coupler further comprises a retention member configured to removably retain the end of the corresponding microduct within the cavity; and
    wherein each coupler further comprises a sealing member configured to provide a seal between the wall and the corresponding microduct within the cavity.

2. The microduct coupling system of claim 1, wherein the retention member comprises a first end with one or more protrusions inside the cavity, and wherein, with the corresponding microduct received in the cavity, the one or more protrusions are configured to engage the wall to prevent the retention member and the corresponding microduct from exiting the cavity.

3. The microduct coupling system of claim 1, wherein the sealing member comprises an O-ring that provides a substantially weather tight seal between the wall and the corresponding microduct within the cavity.

4. The microduct coupling system of claim 1, wherein the opening into the cavity is an entrance opening and wherein the wall further provides an exit opening in the cavity on the second side of the support structure for a cable within the corresponding microduct to exit the cavity.

5. The microduct coupling system of claim 4, further comprising a plug that fits within the exit opening to close off access to the cavity from the second side of the support structure.

6. The microduct coupling system of claim 4, wherein the wall comprises a first portion that provides the entrance opening and a separable second portion that provides the exit opening, wherein separation of the first portion and the second portion provides access to the sealing member within the cavity.

7. The microduct coupling system of claim 6, wherein the support structure comprises a first part that connects together the first portions of the walls of the plurality of couplers, and a second part that connects together the second portions of the walls of the plurality of couplers, and wherein the first and second parts of the support structure are fastened together to form the plurality of couplers.

8. The microduct coupling system of claim 1, wherein the support structure comprises a portion of an exterior wall of a terminal enclosure or a port adapter for a terminal enclosure.

9. The microduct coupling system of claim 1, wherein the support structure forms a panel configured to be removably mounted to at least one of a port adapter and a terminal enclosure, as at least one of an exterior wall interface and an interiorly mounted coupling system for the plurality of microducts.

10. A microduct port adapter, comprising:
    a base unit comprising
        a bottom wall having a first end and a second end,
        a first side wall extending between the first end and the second end,
        a second side wall extending between the first end and the second end,
        at least one cable port at the first end,
        a support structure coupled at the second end of the base unit, the support structure having a first side facing out away from the base unit and a second side facing an interior of the base unit, and a plurality of couplers configured to receive and removably retain a corresponding plurality of microducts on the first side of the support structure; and a cover hingedly coupled to the base unit for covering the interior of the base unit.

11. The microduct port adapter of claim 10, wherein each coupler comprises a wall connected to the support structure, wherein the wall defines a cavity for receiving an end of a corresponding microduct and provides an opening into the cavity on the first side of the support structure for the corresponding microduct;

wherein each coupler further comprises a retention member configured to removably retain the end of the corresponding microduct within the cavity; and wherein each coupler further comprises a sealing member configured to provide a seal between the wall and the corresponding microduct within the cavity.

12. The microduct port adapter of claim 10, further comprising a third side wall at the second end of the base unit coupled between the first and the second side walls and opposite the at least one cable port at the first end, the third side wall comprising the support structure and the plurality of couplers configured to receive and removably retain the corresponding plurality of microducts.

13. The microduct port adapter of claim 10, further comprising a removable panel at the second end of the base unit removably coupled between the first and the second side walls and opposite the at least one cable port at the first end, the removable panel comprising the support structure and the plurality of couplers configured to receive and removably retain the corresponding plurality of microducts.

14. The microduct port adapter of claim 10, wherein the at least one cable port at the first end of the base unit is configured to connect to a corresponding cable port of a terminal enclosure.

15. The microduct port adapter of claim 10, wherein each of the couplers has an exit opening, and further comprising a plurality of plugs that fit into exit openings of the plurality of couplers.

16. A microduct coupling panel, comprising:

a frame having a generally planar configuration with a first side and a second side opposite from the first side;

a perimeter configured to removably couple with a corresponding coupling portion of at least one of a terminal enclosure and a port adaptor; and a plurality of couplers connected to the frame in a grid arrangement;

wherein each of the plurality of couplers comprises a wall defining a cavity for receiving an end of a corresponding microduct, provides an opening into the cavity on the first side of the frame for the corresponding microduct, and provides an exit opening in the cavity on the second side of the frame for a cable within the corresponding microduct to exit the cavity;

wherein each coupler further comprises a retention member configured to removably retain the end of the corresponding microduct within the cavity; and wherein each coupler further comprises a sealing member configured to provide a seal between the wall and the corresponding microduct within the cavity.

17. The microduct coupling panel of claim 16, wherein the wall comprises a first portion that provides the entrance opening and a separable second portion that provides the exit opening, wherein separation of the first portion and the second portion provides access to the sealing member within the cavity.

18. The microduct coupling panel of claim 17, wherein the frame comprises a first part that connects together the first portions of the walls of the plurality of couplers, and a second part that connects together the second portions of the walls of the plurality of couplers, and wherein the first and second parts of the support structure are fastened together to form the plurality of couplers.

* * * * *